Aug. 11, 1964    R. POLK, JR    3,143,844
FRUIT HARVESTER
Filed March 6, 1961    5 Sheets-Sheet 1

INVENTOR
RALPH POLK, JR.

BY *Cushman, Darby & Cushman*
ATTORNEYS

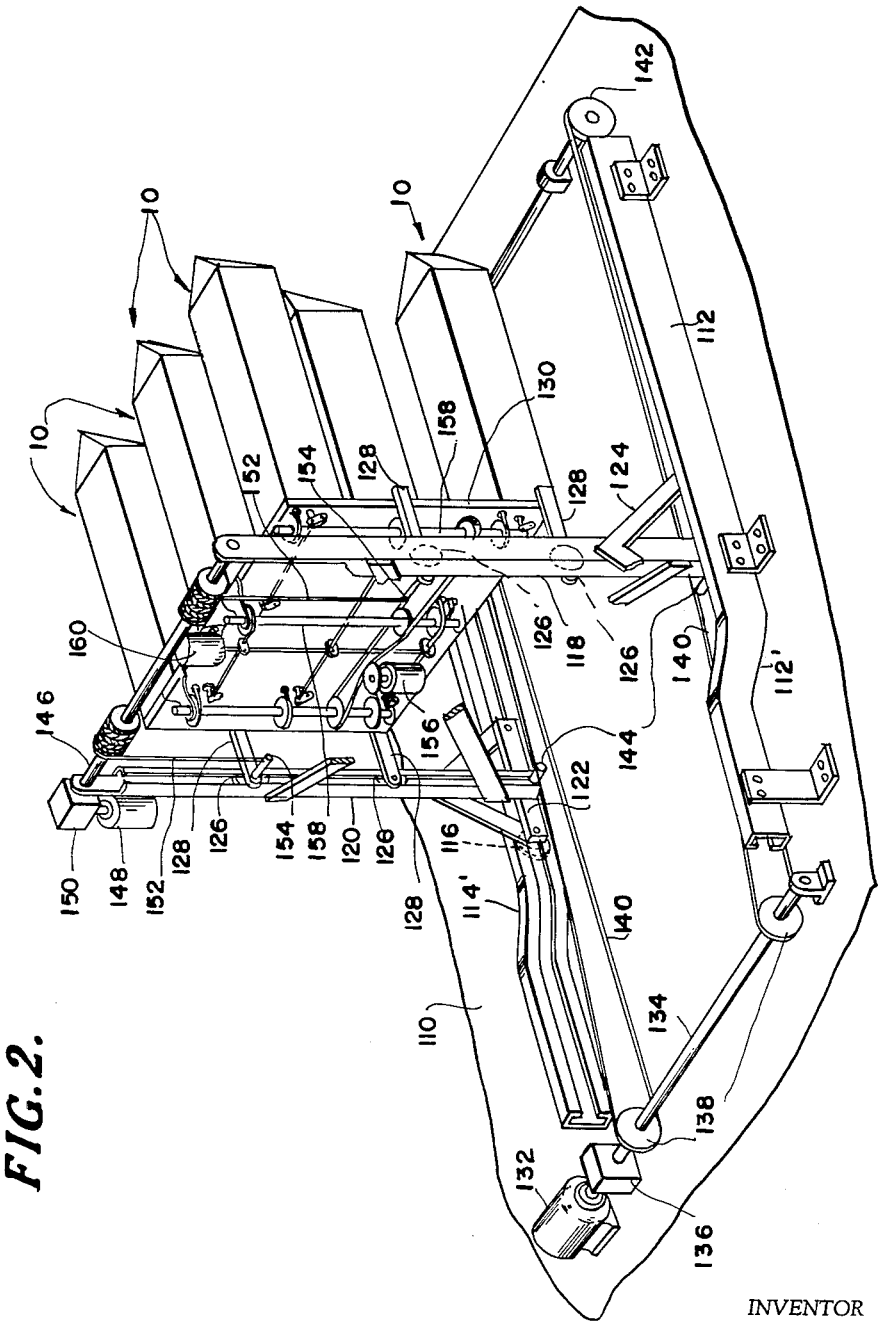

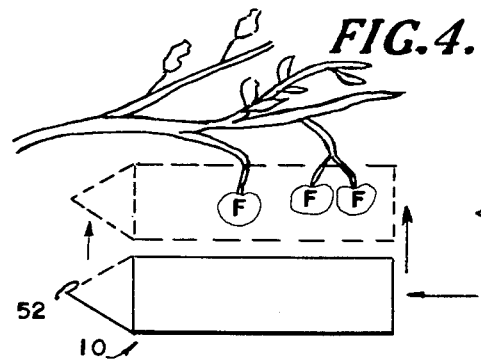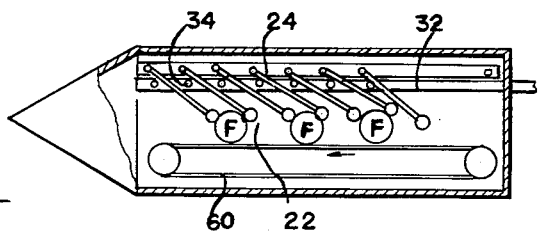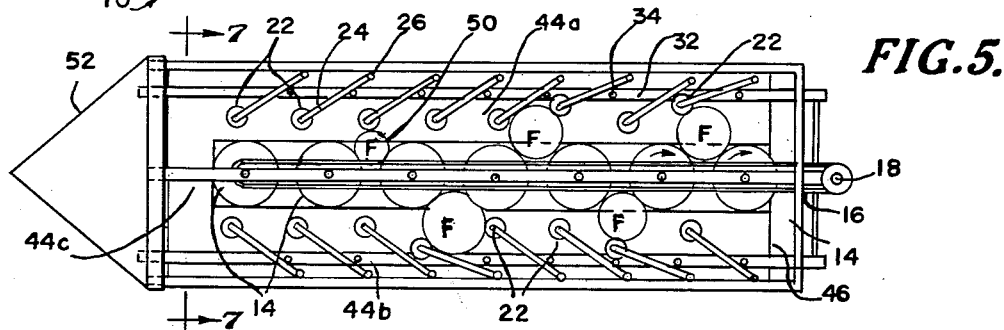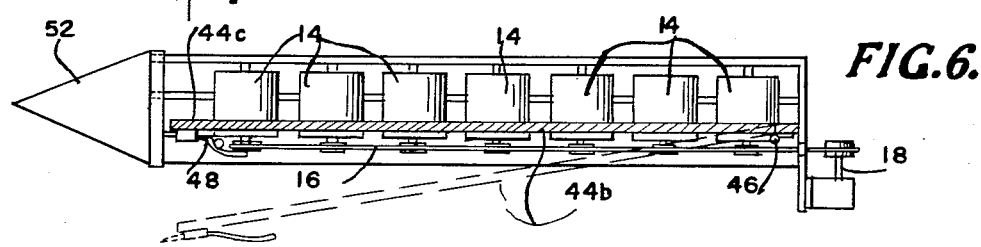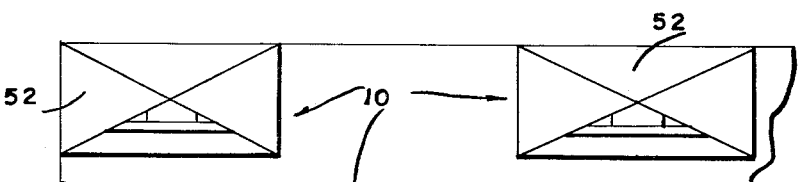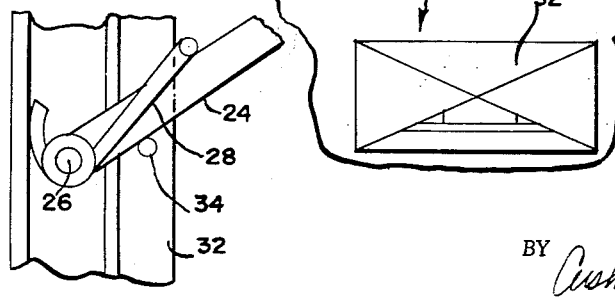

Aug. 11, 1964  R. POLK, JR  3,143,844
FRUIT HARVESTER

Filed March 6, 1961  5 Sheets-Sheet 4

INVENTOR
RALPH POLK, JR.

BY
Cushman, Darby & Cushman
ATTORNEYS

Aug. 11, 1964 R. POLK, JR 3,143,844
FRUIT HARVESTER
Filed March 6, 1961 5 Sheets-Sheet 5
FIG.12. FIG.13. FIG.14.
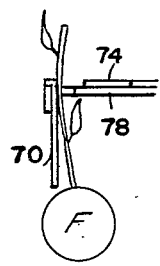 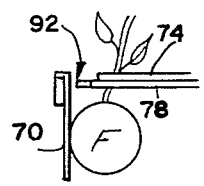 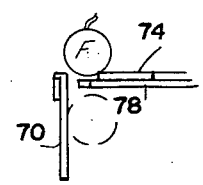
FIG.9.
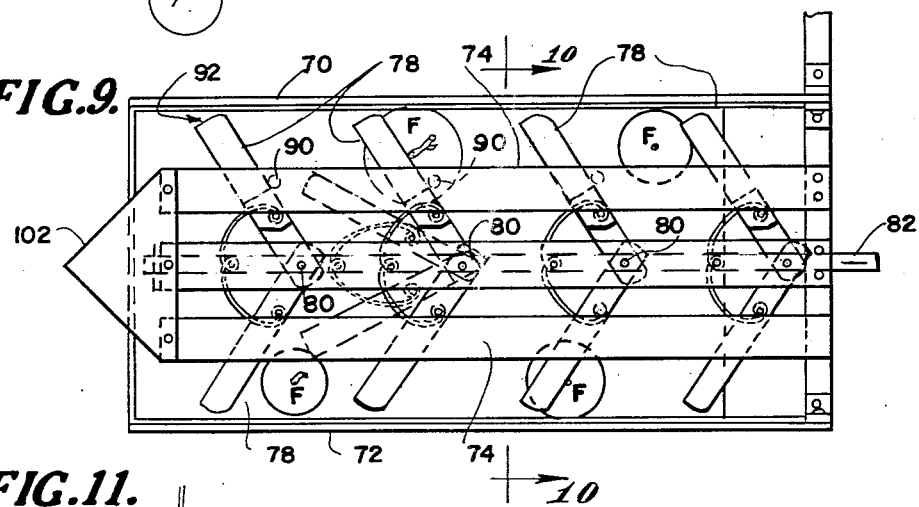
FIG.11.
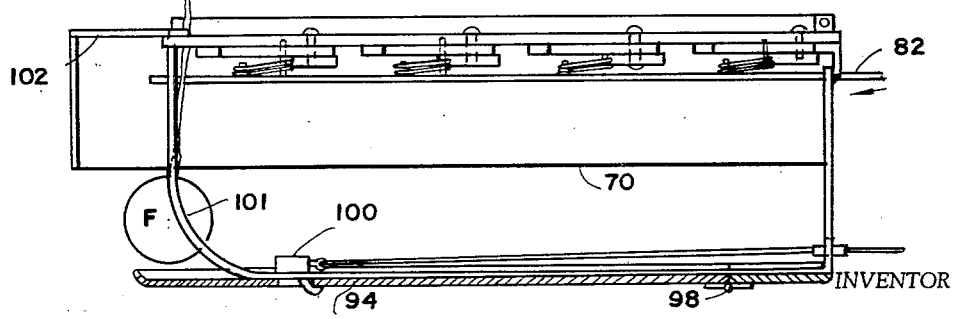
INVENTOR
RALPH POLK, JR.
BY Cushman, Darby & Cushman
ATTORNEYS

United States Patent Office 3,143,844
Patented Aug. 11, 1964

3,143,844
FRUIT HARVESTER
Ralph Polk, Jr., % The Polk Co., P.O. Box 3208, Tampa, Fla.
Filed Mar. 6, 1961, Ser. No. 93,645
12 Claims. (Cl. 56—328)

This invention relates generally to methods and apparatus for harvesting tree-grown fruit or the like, more particularly to such methods and apparatus for harvesting a plurality of fruit at one time.

The present practice in fruit harvesting is to pick the fruit by hand or by relatively simple mechanical means such as that shown in the Patent No. 2,535,542, issued to Lehman et al., dated December 26, 1950, which discloses a portable device which operates to pick only one or two pieces of fruit at a given time. All of the present practices are therefore quite inefficient and time-consuming, as well as leading to a considerable amount of fruit damage in the picking process. There exists, therefore, a great need in the harvesting industry for means to harvest fruit at a faster rate and with a lower percentage of loss.

In accordance with the present invention there are provided picking units which are inserted into the tree from the sides. One type is then lifted up a short distance. Several pieces of fruit are then picked, whereupon the unit is withdrawn from the tree. A further feature of the invention is to place a considerable number of individual picking units upon supporting structure, spaced apart laterally and vertically, and to operate these units as a group into and from the trees. This array of units may be mounted upon a vehicle so that a tree may be quickly picked in an automatic sense.

It is therefore a primary object of the invention to provide new fruit picking or harvesting units.

A further object of the invention is to provide an array of fruit picking units, so arranged that a tree may be rapidly picked.

Further objects and the entire scope of the invention will be apparent from the following detailed description of illustrative embodiment, and from the appended claims. The illustrative embodiments may be best understood by reference to the accompanying drawings, wherein:

FIGURE 2 is an isometric view which shows the apparatus of FIGURE 1 in greater detail.

FIGURE 4 shows two steps in the positioning of a fruit picking unit to collect fruit thereinto.

FIGURE 5 shows a top view of a first embodiment of fruit picking unit in accordance with the invention.

FIGURE 6 shows a side elevational view partly in section of the unit of FIGURE 5.

FIGURE 7A shows a detail of spring construction also shown in FIGURE 7.

FIGURE 7B shows an end view of three units of the type shown in FIGURES 5–7.

FIGURE 8 shows a second embodiment of fruit picking unit in accordance with the invention.

FIGURE 9 shows a top plan view of third embodiment of fruit picking unit in accordance with the invention.

FIGURE 11 shows a side elevational view with side panel removed, of the embodiment of FIGURE 9.

FIGURE 12 shows a piece of fruit within the unit of FIGURE 9 in one state.

FIGURE 13 shows a piece of fruit within the embodiment of FIGURE 9 in a second state, and FIGURE 14 shows a piece of fruit resting on the top of a picking unit according to the embodiment of FIGURE 9.

FIGURES 1 and 2 show a general organization of a plurality of individual fruit harvesting or picking units 10, for simultaneous operation according to a given method for picking fruit from its tree. A complete explanation of these views will be given hereinafter, following a detailed explanation of two illustrative embodiments of the individual fruit picking units.

Figure 1:
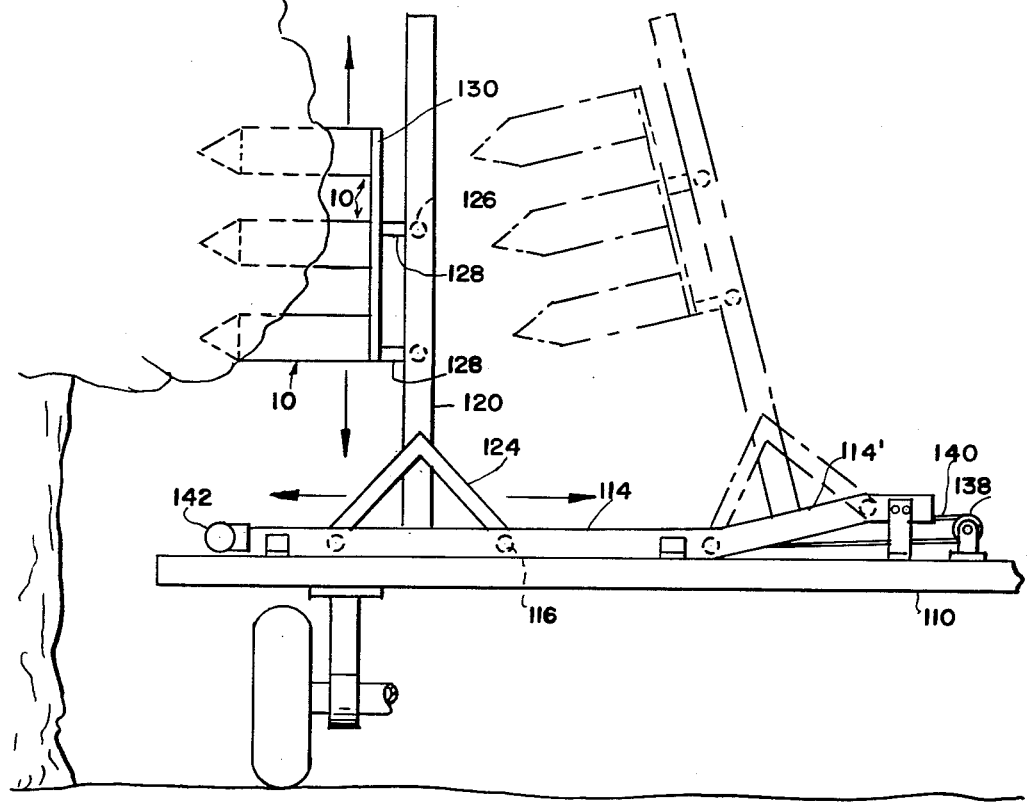
FIGURE 1 shows a side elevational view of fruit harvesting apparatus in accordance with the invention.

Referring now to FIGURES 4, 5, 6, 7 and 7A, a first illustrative embodiment of a fruit harvesting unit according to the invention will be described. This embodiment can be conveniently termed a fruit twisting picker.

As suggested diagrammatically in FIGURE 4, the unit, designated in general by reference character 10, will be operated by first moving it horizontally into the periphery of the tree, in general toward the center thereof, and then raising the unit vertically for a distance substantially its own height. These movements cause the unit to be placed beneath the fruit F, and then raised upwardly so that the fruit moves into the confines of the unit.

The unit itself comprises a horizontally elongated casing defined by an open-topped frame having spaced apart side walls. Within the casing are a plurality of cylinders or rollers 14 which are arranged to rotate about a vertical axis. These may be rotated in unison as by a roller link chain 16 driven from a suitable source of power (not shown in FIGURES 4–7) coupled to shaft 18 and delivering power to the chain 16 via sprocket 20. The cylinders 14 are placed in a row, as best shown in FIGURE 5.

Outwardly of the cylinders 14 are a plurality of idler rollers 22, each supported upon an arm 24 pivoted as at 26 to one of the frame members of the unit. A spring 28 is provided for engaging each arm 24, and otherwise passing about the pivot post 26 and resting against a part 30 of the framing of the unit. The spring is arranged to urge the idler rollers 22 in a direction toward engagement with the power driven rollers 14.

Each row of arms 24 has associated with it an operator controlled arm restraining bar 32, there being an upstanding pin 34 on bar 32 for every one of the arms 32. The arrangement of the bar 32 and pins 34, as may be best understood by reference to FIGURE 5, is such that rectilinear motion of the bar in suitable guide slots in the framework, causes the pins 34 to engage the arms 24, and to swing same towards the outer sides of the harvesting unit, and away from the rollers 14. Additionally, movement of the bar 32 in the opposite direction, so as to permit the springs 28 to urge the arms 24 inwardly, may be limited so that movement of the rollers 22 toward the rollers 14 may be terminated prior to engagement of the rollers 22 with the rollers 14. Thus, the pins 34 also serve as stop means for the arms 24.

Figure 7:
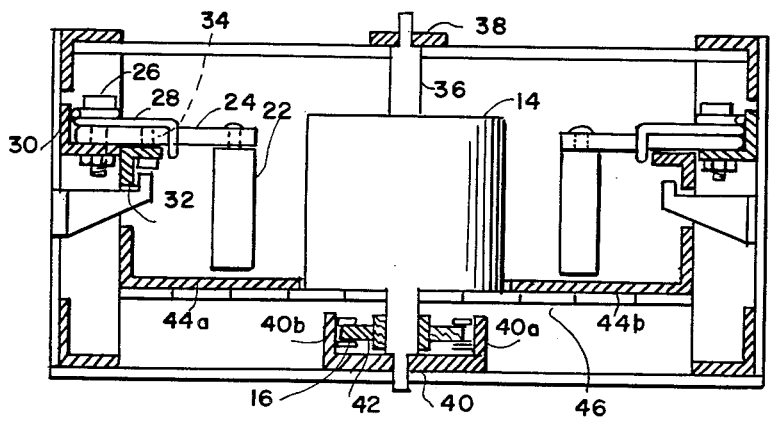
FIGURE 7 shows an end elevational view partly in section of the embodiment of FIGURE 5.
Figure 10:
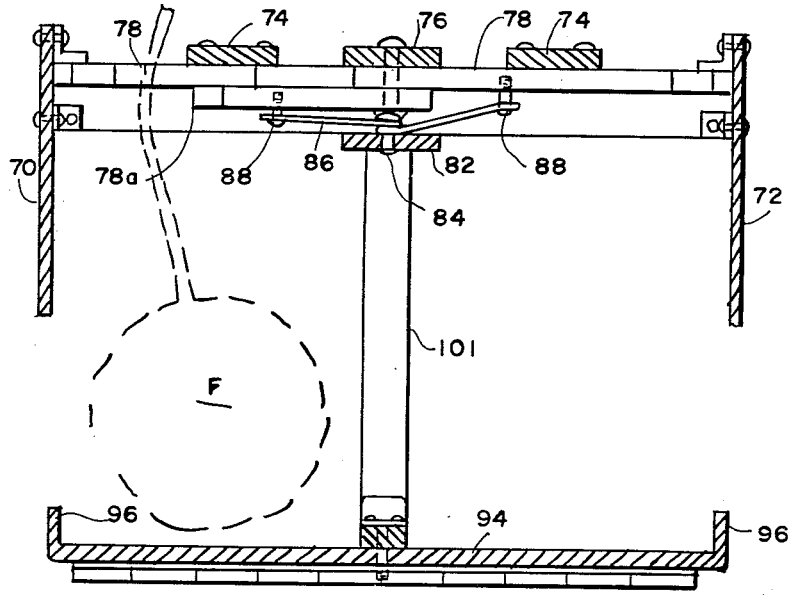
FIGURE 10 shows an end elevational view in section taken substantially along the line 10—10 of FIGURE 9.

Details of the framing of the unit will not be given, because any conventional framing technique will be satisfactory. Details of construction are best shown in FIGURE 7, which is somewhat enlarged for the sake of clarity. It will be noted here that the power driven rollers 14 may be provided with axles 36 turning in apertures in an upper bearing member 38 and in a lower bearing member 40. The latter is preferably provided in U-shape, so that the upstanding sides 40a and 40b which serve as guides to maintain the roller link chain 16 upon sprockets 42 which are fixed to the axles 36 of the rollers 14.

The unit is further provided with a floor member beneath the rollers 22, this shown in the drawings as made up of one section 44a and another section 44b which may join together at the end of the unit, as at 44c, leaving an open central area to accommodate the sprockets and chain. The floor member made up of these parts may be hinged as at 46 and upon release of a latch device 48 will permit the floor to swing downwardly to unload fruit, in a manner to be explained hereinafter.

The operation of the harvesting unit shown in FIGURES 4–7a is as follows: The bars 32 are moved by the operator by any convenient mechanism (not shown) so as to have the pins 34 engage the arms 24 and move same outwardly against the force of springs 28. In this condition, the unit is moved into the tree and upwardly, so that pieces of fruit F move into the unit between the rollers 14 and 22 and rest upon the floor 44. The rollers 44 are driven in rotation by use of the chain 16. Now the bars 32 are retracted so that the springs 28 force the arms outwardly and wherever a piece of fruit of more than minimum size exists, one or more of the rollers 22 will engage the fruit and force it against one or more of the rotating rollers 14. It will now be apparent that the fruit will be rotated by the rollers 14 under the restraining forces of the rollers 22, and the stems will be twisted from the fruit.

Where it is desired that fruit of less than a given diameter will not be picked, the aforesaid limitation upon the movement of the rollers 22 toward the rollers 14 will permit such undersize fruit to exist in the unit without being rotated, and therefore same will remain attached to their stems. Such undersized fruit is exemplified in FIGURE 5 by reference character 50.

After the fruit of said minimum size has been twisted from its stem due to the operation as aforesaid, the unit may be withdrawn from the tree, preferably by first lowering it substantially its own height and then withdrawing it horizontally. Thereafter, the floor 44 may be unlatched and moved downwardly whereupon the picked fruit will roll out into any convenient container (not shown) which the user may employ for collecting the fruit. It will also be possible, if there is no bottom side plate provided in the pointed end 52 of the unit which serves to facilitate insertion into the tree (see FIGURE 7B) to tip the entire unit forward so as to decline the floor toward the end 52, and permit the fruit to roll along the floor and out, the rollers 22 being held out of the way of such motion of the fruit, by the bars 32.

A modification of the unit just described, is shown in FIGURE 8, wherein a travelling belt 60 may be employed to revolve fruit F, in place of the rollers 14, the other parts being similar and given the same reference characters as in the figures previously discussed.

A second major illustrative embodiment of a picking or harvesting unit according to the invention is shown in FIGURES 9 to 14, inclusive. This embodiment is primarily characterized by side wall members 70 and 72 extending the length of the unit which depend downwardly from a horizontal plane in which members 74 extend the length of the unit. This plane is additionally occupied by a central member 76 which has pivotally attached thereto at successive points along its length, a plurality of stem-engaging arms 78. The pivot points are designated by reference characters 80. Beneath the member 76 is a member 82, which is mounted in the framework by suitable means so that it may be reciprocated with respect to the remaining parts of the unit. At spaced apart points along member 82 are pins 84 about which springs 86 are trained, these springs otherwise extending to pins 88 in the aforesaid arms 78. For convenience, the arms 78 on one side may have an offset 78a in order to permit these arms at pins 76 to be positioned one below the other, while nevertheless permitting their outer extremities to be in the same plane. As best seen in FIGURE 9, reciprocation of the member 82 to the right will cause the springs 86 to force the arms 78 outwardly so as to almost engage the side walls 70 and 72. However, for purposes which will become apparent hereinafter, limiting pins 90 are preferably provided in member 74 so that the extreme ends of the arms 78 will not meet the side walls, but will provide a clearance slightly larger than the typical stem diameter to be expected, this clearance being indicated in FIGURE 9 at one of the arms 78, by reference character 92. In general, the clearance 92 is less than the radius of the minimum sized fruit to be picked.

When member 82 is moved to the left as shown in FIGURE 9, the springs 86 will cause the arms 78 to be moved inwardly until their ends pass beneath the members 74. This position is suggested by the dash line showing in FIGURE 9.

A floor 94 is provided for the unit, having upturned edges 96 for preventing fruit from rolling out sideways, but nevertheless there being a distance from the bottom of wall 70 or 72 to the edge 96, of substantially the diameter of fruit to be picked. Floor 94 may be hinged as at 98 with a latch mechanism 100 for permitting the downward slanting of the floor for extracting fruit. However, as also will be explained, if the entire unit be tipped forward, fruit will roll out the open end. The floor 94 may most conveniently be supported by a central and rearwardly curving member 101.

A triangular member 102 is provided for guiding the stems of fruit as they pass into the unit, as will be now explained.

The operation of the embodiment of FIGURES 9 to 14 is as follows: The member 82 is moved so that the arms 78 are retracted beneath the member 74. In this condition the unit is moved into the tree. During this movement fruit in the path of the unit will pass into the zone defined by the members 74 at the top, the walls 70 or 72 at the sides, and the floor 94 at the bottom. After the unit is completely inserted into the tree, the member 82 is moved so that the arms 78 are now brought to their outermost position (as shown in solid line, FIGURE 9). Now the unit is retracted from the tree. As the latter motion is accomplished, the stems of the fruit slide along the inclined edges of arms 78, approaching the clearances 92. For fruit which is hanging down in the unit so that the greater part of it is below the lower edge of side wall 70 (see FIGURE 12) the stem will slide along arms 78 and pass through the clearance 92, and this fruit will not be picked. This is a desirable situation, because too much stem would otherwise be left with the fruit. However, for fruit which has been hanging so that it lies against the wall 70 (see FIGURE 13), the displacement of the point of entry of the stem into the fruit from the side wall 70 is such that the stem will be sharply bent over the arm 70, and strain will be otherwise put upon the stem as it attempts to reach the clearance 92, so that the stem will be either broken at the edge of arm 78, or will be pulled from the fruit. Still further, however, undersized fruit even resting against the wall 70, will in most cases not be picked, because its stem will be able to reach and pass through the clearance 92.

A further desirable feature of the structure is that the members 74 be spaced from the walls 70 a distance such that even the smaller sized fruit cannot gain a position between the wall 70 and the members 74 so that operation of an arm 78 would crush the fruit (see FIG. 14). Instead, the fruit will sit upon the member 74 and the upper terminus of the wall 70 and the arms 78 will pass beneath it.

It will now be apparent that of the illustrative embodiments of individual harvesting or picking units described above, in each case the picking unit involves the horizontal insertion of the unit into the tree. The embodiments shown in FIGURES 4–7 and 8 also require an upward movement while in the tree. The embodiment of FIGURES 9 to 14 does not require this final upward movement. However, the general similarity of the respective embodiments is apparent, and therefore the following explanation of the general harvesting apparatus and method will proceed upon the assumption that either type of picking unit will be employed.

Figure 3:
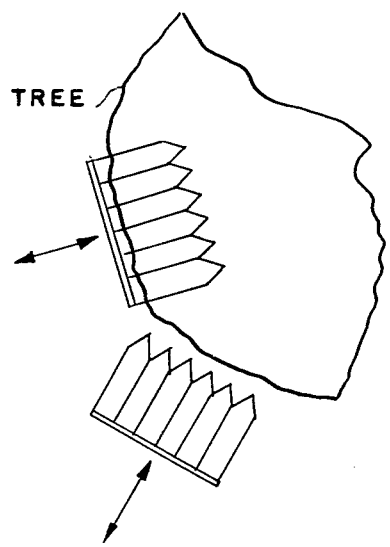
FIGURE 3 shows a method of use of the aforesaid equipment in the picking of fruit from a tree.
Figure 2A:
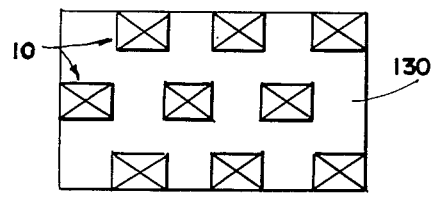
FIGURE 2A shows a preferred arrangement of individual fruit picking units in apparatus according to FIGURES 1 and 2.

Referring to FIGURES 1, 2 and 2A, in accordance with the invention, a plurality of the picking units 10 may be arrayed upon a supporting structure, with the array from the front having the units distributed, preferably as shown in FIGURE 2A. As will become further apparent as this description proceeds, such an array, upon a wheeled vehicle or the like, may be driven about the tree, as shown in FIGURE 3, and the units repeatedly inserted into the tree until the latter is picked.

In FIGURES 1 and 2 the reference character 110 designates the bed of a suitable wheeled vehicle upon which two rails 112 and 114 are affixed. Within the rails, on suitable rolls 116, there is carried a generally vertical support frame which includes, opposed upright members 118 and 120, these being supported on the rollers 116 by cross piece members 122 and suitable angular bracing members 124. The upright members 118 and 120 are themselves rails within which rollers 126 may run, these serving to support, by arms 128, a panel member 130 which, in turn, supports a plurality of the picking units 10. For moving the entire structure which supports the picking units 10 back and forth in a horizontal direction on the vehicle bed, there may be provided a motor 132 which drives a shaft 134, through a gear box 136, if desired. Shaft 134 has affixed thereto sprockets 138 which drive roller link chains 140, which run over idler sprockets 142 and which are fixed at one point 144 to the movable structure comprising the upright members 118 and 120. Accordingly, in operation of the motor 132 by controls (not shown) accessible to an operator, the entire movable structure may be operated back and forth along the rails 114.

For the purpose of lifting the picking units 10, and lowering same, a shaft 146 may be journalled in bearings at the upper ends of members 118 and 120. This shaft may be driven by a motor 148, through gear box 150 if desired. (Details of this raising-lowering mechanism and other details are shown in FIGURE 2 only).

Cables 152 may be trained about the shaft 146, and otherwise attached as at points 154 to the structure comprising the panel member 130 and the arms 128. Accordingly, the entire assembly of picking units may be raised and lowered under the control of motor 148.

There may be carried upon panel member 130, various mechanisms for performing the detailed operation of the individual picking units. Assuming for the purposes of illustration that the picking units 10 shown in FIGURE 2 are of the type described in connection with FIGURES 4-7A hereinabove, it is required to provide a rotary motion, for driving the revolving fruit picking rollers. This may be performed by the provision of a motor 156 on the panel member 130, driving, by means of suitable roller link chains, shafts 158 for said purpose. For causing the necessary reciprocation of parts within the respective picking units, there may be provided a reciprocating motor, such as a hydraulic cylinder-piston device 160, which will operate the individual push-pull rods of the pickers through a suitable arrangement of rods and ball crank levers, as shown in FIGURE 2.

As shown in FIGURES 1 and 2, the rails 112 and 114 are elevated as at 112′ and 114′ at the inboard end thereof. The purpose of this elevation is to cause the picking units to tilt forward (see FIG. 1) when extracted from the tree. This will permit fruit to roll out the forward ends of the picking units so that the latter will be prepared for another insertion into the tree. The fruit may fall from the picking units into any suitable container which may be placed beneath same for the purpose. Of course, it will be understood, that if the fruit cannot be dropped from a picking unit because of possible damage to the fruit, then the elevated portion 11′ and 114′ of the rails may be dispensed with, so that the unit will not tilt, and the units can be unloaded by any other suitable technique.

It will now be apparent that the apparatus as described permits of an entirely new method of picking fruit from trees. It will be assumed that an operator is provided with controls for moving the picking units as an assembly back and forth horizontally, and also in a vertical direction. Therefore, while the vehicle is driven around the periphery of the tree, the operator can repeatedly move the units into the tree, upwardly if necessary, then withdraw the units from the tree, and empty same. It so happens that in the case of most fruit trees the fruit is located about the outer periphery and therefore the picking units per se need not be equal in length to the radius of a tree. In the case of most citrus fruits, a tree with a radius of ten feet will bear substantially all of its fruit in the outer three feet.

It is to be understood that the foregoing detailed descriptions of illustrative embodiments of the invention have been given only for purposes of explaining the basic principles of the invention, and the scope thereof is to be determined from the appended claims.

What is claimed is:

1. Apparatus for harvesting stem-supported fruit comprising: a generally vertical support frame; means mounting said vertical support frame for reciprocal movement in a horizontal plane; a plurality of fruit-harvester units, each of said units including a horizontally elongated casing of sufficient dimension to surround a plurality of stem-supported fruit, and means within said casing for engaging the fruit and picking the same from its stem, said casing having an aperture in its top of sufficient dimension to permit the stems of stem-supported fruit in the casing to extend upwardly from said casing whereby fruit still attached to a branch may be contained in said casing; means mounting one end of said units on said vertical support frame so that said units extend horizontally from said frame.

2. Apparatus as in claim 1 wherein the units are positioned in at least two horizontal rows and spaced apart in each row, and the position of the units in adjacent rows are staggered so that no unit is immediately above another.

3. Apparatus as in claim 1 wherein the apparatus further includes means for elevating said mounting means for said units a distance at least equal to the vertical dimension of the individual units.

4. A device for harvesting stem-supported fruit comprising: a frame having a generally open top and a generally open end and including a generally vertical wall member; stem guiding means including a generally horizontal arm mounted on said frame for movement toward and away from said wall member at an acute angle at a point a predetermined distance above the lower edge of said wall member; and means for limiting the approach of the end of said arm nearest said wall member to a distance of about the radius of minimum sized fruit to be harvested, whereby fruit hanging on a tree may be surrounded by said frame and whereby movement of said frame radially outwardly of the tree will cause large fruit to be engaged by said wall member and the stems thereof to be bent over said arm and thereby broken and whereby small fruit will pass out the open end of said frame without being picked, the stems thereof passing between said arm and said wall member.

5. A harvesting device as in claim 4 further comprising: means adjacent said arm for blocking entry of fruit into a position between said wall member and said arm thereby preventing crushing of fruit by said wall member and said arm.

6. A harvesting device as in claim 4 having a plurality of said arms arranged in a generally horizontal plane and further comprising: means for pivotally mounting the end of each arm which is remote from said wall member; and means for moving said arms in unison about said pivot means.

7. A device for harvesting stem-supported fruit comprising: an open-topped frame; a plurality of revolvable members disposed within said frame in horizontally spaced apart relationship; means mounting said members for rotation about vertical axes through the members; means mounting at least one of said members for movement toward and away from another of said members between a position in which the distance between the members is sufficient to permit a fruit to freely enter the space between the members and another position in which the movable member urges any fruit in said space into engagement with said other member; means for revolvably driving one of said members; and means for biasing said movable member toward said other position whereby said frame may be moved into a tree to a position in which a fruit is in said space and whereby when said movable revolvable member moves toward the other member the fruit is engaged by the members and twisted from its stem.

8. Apparatus as in claim 7 wherein there are a plurality of movable revolvable members and wherein said biasing means independently biases each of said movable revolvable members toward said position in which fruit will be engaged thereby, and further including operator-controlled means for moving said members against said biasing means.

9. Apparatus as in claim 7 further including stop means limiting the movement of said movable revolvable member toward another member, thereby providing that fruit below a predetermined size will not be engaged by said members and will not be twisted from its stem.

10. Apparatus as in claim 7 wherein said frame is horizontally elongated and contains a plurality of movable revolvable members which are spaced from each other along the length of frame and are spaced from the other revolvable member in a transverse direction.

11. Apparatus as in claim 10 wherein said movable revolvable members are rollers mounted on the ends of arms, the other ends of which are pivoted for movement about vertical axes.

12. Apparatus as in claim 11 wherein said means for biasing said movable revolvable members between said positions includes spring means biasing each of said arms independently toward a fruit engaging position and an operator-controlled member in engagement with said arms to limit movement of said arms by the action of said springs to thereby provide that fruit below a predetermined size will not be twisted from its stem, said arms against the action of said springs so as to permit entry of fruit into the spaces between revolvable members.

References Cited in the file of this patent

UNITED STATES PATENTS

| 2,641,888 | Grether | June 16, 1953 |
| 2,645,893 | Horst | July 21, 1953 |
| 2,698,508 | Hollister | Jan. 4, 1955 |
| 2,968,141 | McGough | Jan. 17, 1961 |
| 3,040,507 | Lasswell | June 26, 1962 |
| 3,077,720 | Grove et al. | Feb. 19, 1963 |

FOREIGN PATENTS

| 25,744 | Finland | Mar. 18, 1953 |
| 549,742 | Great Britain | Dec. 4, 1942 |
| 780,572 | Great Britain | Aug. 7, 1957 |